TRANSISTOR FLIP-FLOP INDICATOR CIRCUIT

Filed Aug. 13, 1957

Jack C. Smeltzer
INVENTOR.

BY Morris Spector
Archer Decker
ATTORNEYS 3,048,823
Patented Aug. 7, 1962

3,048,823

TRANSISTOR FLIP-FLOP INDICATOR CIRCUIT

Jack C. Smeltzer, Torrance, Calif., assignor, by mesne assignments, to Thompson Ramo Wooldridge Inc., Cleveland, Ohio, a corporation of Ohio Filed Aug. 13, 1957, Ser. No. 678,015
4 Claims. (Cl. 340—173)

This invention relates to transistor trigger circuits, and, more particularly, to means for indicating the present state of a transistor bistable state circuit, such as a flip-flop.

In electronic digital computers which express numbers in binary form, bistable state circuits such as flip-flops are frequently included to store signals representing the digits. The development of the transistor has led to the use of transistor stages in the mechanization of the flip-flop circuit. The resulting advantages have been circuit simplicity, reliability, small size and weight, and low power consumption.

The "static" type of flip-flop, of which the Eccles-Jordan trigger circuit is representative, is characterized by two stable states, namely, a "true" condition in which one trigger stage conducts current and the other trigger stage is cut off, and the "false" condition in which the conduction of the stages is reversed. The storage of a digit "1" may be considered to be the existence of the true condition and the storage of a digit "0" may be considered to be the existence of the false condition. Digit recognition may be manifested by the voltage levels on a pair of output lines, one line being associated with each stage of the flip-flop.

Provision for visual indication of the binary content of the static flip-flop may be made by means of a circuit whereby a relay coil is connected in the output line of one of the flip-flop trigger stages, and the relay contacts are arranged to control the power supply of an incandescent lamp indicator. This arrangement may require the inclusion of components incidental to the function of visual indication; thus, for satisfactory operation at a high switching rate, it is necessary to include a shunt circuit to compensate for the inductance of the relay coil. Further, since the loop introduced by the shunt circuit is characterized by the building up of oscillating currents, there is required a unilateral conducting device such as a crystal diode to damp out these oscillations. It is, of course, undesirable to make provisions such as these, since they add to computer size and complexity.

In another type of indicator circuit, an isolating stage, which may be a transistor amplifier, is connected to the output circuit of one of the flip-flop trigger stages. An incandescent lamp and a source of power therefor are serially connected as a load for the isolating transistor. The expenditure of power in this type of circuit is considerable and if a neon lamp were utilized instead of the incandescent lamp, the size of the required voltage supply for the neon lamp would not be commensurate with that required by the other components of a transistorized computer system.

Neither of the above techniques is adaptable to the indication of the content of the "phase bistable" type of flip-flop.

The phase bistable flip-flop is a "dynamic" type in that the continuous switching of the flip-flop from a true state to a false state may represent the digit 1, and the continuous switching of the flip-flop from the false state to the true state may represent the digit 0. Thus the output of this flip-flop is a square wave form, the phase of which, when referenced to the period of a timing signal, is taken to indicate whether it is storing a digit 1 or a digit 0. It is apparent that the aforementioned indicator systems would give the same indication for either digit content of this type of flip-flop.

The recurring, i.e., "A.C.", nature of the phase bistable flip-flop output requires that the means provided to detect the storage condition be synchronized with the switching of the flip-flop in order that the digit presently being stored be not recognized as its dual. As will be shown herein, a means admirably suited for this function is a reference flip-flop which may be of the same construction as the storage flip-flop. The reference flip-flop is arranged to continuously generate a signal output corresponding to one of the digits, for instance, the digit 1. Generation of this digit 1 by the reference flip-flop is in synchronism with the generation of the digit presently being stored by the storage flip-flop: for each digit output from the latter, be it a digit 1 or a digit 0, the reference flip-flop generates a digit 1 in synchronism therewith. The outputs of the flip-flops are conveyed to a phase detector which produces an output during a timing period comprising a square wave voltage only if its inputs are in phase for the timing period; otherwise, the phase detector output is a steady state voltage. It follows that a square wave voltage output from the phase detector indicates that a digit 1 is presently contained in the storage flip-flop, and a steady state voltage output from the phase detector indicates that a digit 0 is presently contained in the storage flip-flop. In the preferred embodiment of the invention, the phase detector is shown in the form of an "and" gate. The "and" gate output is amplified by a transistor amplifier stage and the amplified signal is transformer coupled to a neon lamp indicator and series resistor. The turns ratio of secondary to primary windings on the transformer is sufficiently high to develop the firing voltage for the neon lamp and the windings are characterized by time constants long enough so that the square wave energization is passed substantially undistorted. Since, as is general practice in electronic computer work, the frequency of the timing signal is high, on the order of 150 kc./sec., which exceeds the flashing rate capability of the ordinary neon lamp, the square wave input to the transformer causes the lamp to be continuously energized. Thus, when there is coincidence of phase between the storage flip-flop and the reference flip-flop, indicating that the storage flip-flop is storing a digit 1, the lamp is continuously lit, and, when there is lack of such coincidence, indicating that the storage flip-flop is storing a digit 0, the lamp is continuously extinguished.

It is thus a primary object of this invention to provide an improved indicator circuit for use with transistor trigger circuits, especially those of the phase bistable flip-flop type.

It is a further object of this invention to provide an improved transistor flip-flop indicator circuit requiring no power supply other than that which supplies the transistor stages.

It is another object of this invention to provide a flip-flop indicator circuit isolated from the flip-flop so that the operation of the flip-flop is not adversely affected by the presence of the indicator circuit.

Other objects and many of the features of the invention will become apparent with reference to the following description of the figures, in which.

Figures 1, 2:
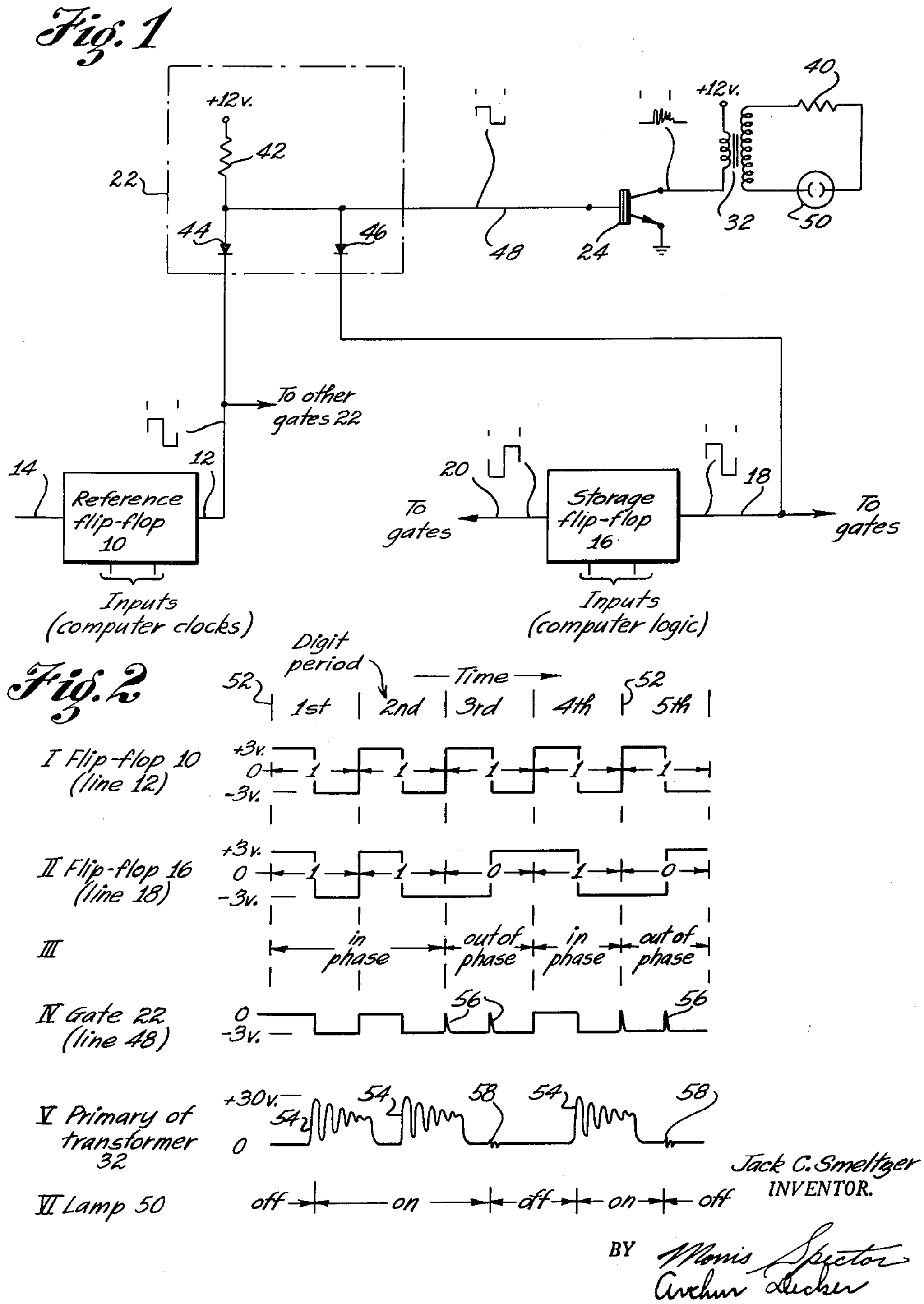
FIGURE 1 is the circuit of the preferred embodiment of the invention.
FIGURE 2 are waveshapes at the indicated points in FIGURE 1, corresponding to an example of the operation of the circuit.

Referring now to FIGURE 1, here is shown the preferred form of the circuit of the invention.

Flip-flop 10 and 16 are identical, and, for the purposes of illustration, will be considered to be of the phase bistable type and to be functionally associated with the logic of a computer. Inputs to reference flip-flop 10 are from the computer "clock" (timing) signals only since the digit content thereof is not modified. Inputs to storage flip-flop 16 are from logical networks such as gates, controlled by other computer signals, which may be flip-flop outputs, timing signals, etc.

Considering storage flip-flop 16, complementary outputs are taken a lines 18 and 20 and comprise symmetrical square wave forms having +3 v. and −3 v. alternations. Flip-flop 16 may be switched to interchange the phase of the output waveshapes at the occurrence of clock signal pulses. These clock pulses may be generated from a timing signal channel on a rotating drum, for instance, or by other means well known in the art. The phase shown, in which the right-hand output of a flip-flop, here on line 18 for flip-flop 16, during a timing signal period, is first at the high potential of +3 v. and then at the low potential of −3 v. (the flip-flop is true, then false), will be understood to represent the storage of a digit 1 by the flip-flop, and the opposite phase, in which the right-hand output, during a timing signal period, is first at the low potential of −3 v. and then at the high potential of +3 v. (the flip-flop is false, then true), will be understood to represent the storage of a digit 0. Thus, FIGURE 1 illustrates the storage of a digit 1 in both both flip-flops 10 and 16.

Reference flip-flop 10 is not subject to change of digit content, since the output thereof is employed to indicate the storage content of a plurality of flip-flops in the computer, the output on line 12 being conveyed to other gates for this purpose.

Lines 12 and 18 of flip-flops 10 and 16, respectively, are connected as inputs to "and" gate 22. "And" gate 22 preferably is comprised of a pair of input crystal diodes 44 and 46, joined to line 48, which is connected through resistor 42 to the positive potential source of +12 v. Diodes 44 and 46 are orientated so that whenever the input signals, on lines 12 and 18, are both at a high potential of +3 v., the output, on line 48, is at +3 v. Any time one or both of the signals on lines 12 and 18 is at a potential lower than +3 v., the output on line 48 is also at this potential.

A stage of isolation and amplification follows "and" gate 22. The amplifier comprises N-P-N transistor 24 loaded by the primary winding of transformer 32. The base electrode of transistor 24 is connected to line 48, the emitter electrode is connected to ground, and the collector electrode is connected to one terminal of the primary winding of transformer 32, the other terminal thereof being connected to the +12 v. supply. The secondary winding of transformer 32 is loaded by neon lamp 50 and current-limiting resistor 40 connected serially. Preferably, transformer 32 comprises a miniature toroid having windings of No. 36 wire and a primary to secondary winding ratio of 1:6. It is also characterized by long inherent time constants for its windings, and thus is capable of passing square waves of repetition rate equivalent to the basic digit (clock) timing period without appreciable distortion. Indicator lamp 50 may be type Ne2 and transistor 24 may be type 2N167. It may thus be appreciated that the indicator circuit corresponding to each computer storage flip-flop may be of quite small size and be packaged as a unit having but four connections: one to reference flip-flop 10, one to its storage flip-flop, one to the D.C. supply voltage, and one to ground.

The operation of the circuit of FIGURE 1 can best be appreciated through observation of the waveshape graphs of FIGURE 2, wherein lines I and II present typical operating voltage outputs of reference flip-flop 10 (line 12) and of storage flip-flop 16 (line 18). It should be appreciated that outputs could be taken instead from lines 14 and 20, lines 14 and 18, or lines 12 and 20 (FIGURE 1) of the corresponding flip-flops, depending upon whether the digit 1 or digit 0 storage state of storage flip-flop 16 is desired to be indicated by lamp 50, or upon loading criteria for the flip-flops, or upon any other relevant consideration in computer design. The arrangement shown is preferred for illustration, however, since it is customary to indicate the digit 1 state of a storage flip-flop. Further, it may be pointed out that the preferred dynamic flip-flops are arranged to be capable of changing storage content between a digit 1 and a digit 0 at the rise (leading edges) of recurring computer clock pulses, indicated in FIGURE 2 by vertical marks 52. The time separation between succeeding vertical marks 52 comprises the basic computer digit (clock) period. It may additionally be noted that the preferred flip-flops are arranged to change state between true and false in the center of a digit period; this is accomplished by means of a recurring timing signal (not shown), of the same repetition rate as the computer clock signal, which appropriately energizes the input gates of the flip-flops.

Line III of FIGURE 2 shows the phase relationship of outputs on lines 12 and 18 of flip-flops 10 and 16, respectively, for the example contemplated. It is seen that, for the time extent of the graphs, the outputs are in phase for two digit periods, then, for one digit period each, out of phase, in phase and out of phase. It is, of course, desired that the indicator circuit cause lamp 50 (FIGURE 1) to be illuminated for time periods proportional to the number of in-phase successive digit periods.

Line IV of FIGURE 2 shows that the output on line 48 of "and" gate 22 (FIGURE 1) is at ground potential only when flip-flops 10 and 16 are simultaneously true, for which condition lines 12 and 18 are at the +3 v. level. This can occur only during the first half of a digit period and, in the illustration, is shown to prevail during the first, second and fourth digit periods of the selected sequence. The rise of lines 12 and 18 to +3 v. results in decreased current through diodes 44 and 46. The voltage on line 48 rises, but cannot exceed ground potential since transistor 24, connected in a grounded emitter circuit with base bias of 0 v. draws current for any base voltage in excess thereof, thus effectively clamping positive-going excursions of voltage on line 48 at ground potential.

When flip-flops 10 and 16 are not both true, such as occurs during the second half of every digit period and also during the first half of the digit periods during which the flip-flops are not both storing a digit 1, the base of transistor 24 (line 48) is biased at the −3 v. level and current from collector to emitter of transistor 24 is cut off. For this condition, line 48 is terminated in a high impedance; the leading edge of the voltage on line 48 (line IV) thus follows very closely that of the leading edge or edges of the flip-flop outputs (lines I and II). However, when the flip-flops are both storing a digit 1, their outputs simultaneously drop to −3 v. at the center of the digit period. At these times (the first, second and fourth digit periods) diodes 44 and 46 conduct increased current while transistor 24 suddenly stops drawing collector to emitter current. Thus at each fall of potential of line 48 from 0 to −3 v. the primary of transformer 32 is shock excited, as shown in line V, and has induced therein voltage excursions 54, which, it may be noted, extend from the center of a digit period to slightly beyond its end. The amplification of the shock excitations in transformer 32 are effective to energize lamp 50, as indicated in line VI.

It may be further noted that, whenever only one flip-flop goes true, such as at the end of the second digit period and at the center of the fifth digit period (lines I and II), a pulse of voltage occurs on line 48. Pulses 56 (line IV) are representative. Pulses 56 are extremely sharp and effect but slight shock excitation of transformer 32, as shown by oscillations 58 (line V). The ratio of windings of transformer 32 is such that the induced secondary voltage caused by oscillations 58 is insufficient to energize lamp 50.

It should be understood that the present indicator circuit is not limited, as illustrated, to the comparison of the states of only two flip-flops; the states of a large number of flip-flops could be simultaneously compared merely by connecting the appropriate output of each flip-flop through a diode to line 48. In this case, indicator lamp 50 would illuminate only if all the flip-flops are storing the same binary digit; such an arrangement may find use as, for instance, a binary comparator circuit.

From the foregoing description, it should be apparent that the present indicator circuit is adaptable to cooperate with flip-flop circuits other than the phase bistable type used for illustration. It should further be apparent that the circuit is also not limited to the elements shown. Thus, the transistor amplifier might well be of the PNP type, in which case the form of "and" gate 22 could be modified by one skilled in the art to provide operation equivalent to the preferred form; the indicating device, although illustrated as a neon lamp, might be of a type characterized by a different principle of operation, such as a meter, electronic "eye," recorder or the like; the "and" gate might be an alternate type of phase detection circuit such as used in oscilloscope or television circuitry, having a relatively high input impedance so as not to affect the normal operation of the flip-flops. Such substitution of elements may be made without sacrifice of reliability or certain other advantages and is contemplated by the invention as within the scope of the appended claims.

What I claim as new and desire to secure by Letters Patent of the United States is:

1. Circuit means for indicating the phase relationship between the outputs of a pair of synchronized phase bistable flip-flops, comprising: a pair of crystal diode rectifiers having anode and cathode elements, the cathode elements being connected one to each flip-flop output and the anode elements being connected to a common line; a source of positive potential; a resistor connected between said positive potential source and the common line; a current multiplication transistor having a base electrode connected to the common line, an emitter electrode connected to ground, and a collector electrode; a step-up transformer having a primary winding and a secondary winding, the primary winding being connected between said positive potential source and the collector electrode of said transistor; and an ionizable lamp indicator and protective resistor therefor connected serially across the secondary winding of said transformer.

2. A circuit for indicating a signal output from a storage phase bistable flip-flop capable of having digit 1 or digit 0 storage content during predetermined periods, the indicated signal output thereof corresponding to the storage of a digit 1, comprising: a reference phase bistable flip-flop synchronized to generate a digit 1 output for each and every signal output corresponding to the storage of either digit by the storage flip-flop; a detector circuit having inputs connected to the outputs of the storage flip-flop and said reference flip-flop, said detector circuit being capable of generating a pulse signal during a period for which the flip-flops are simultaneously generating digit 1 signals; and an indicator circuit responsive to the pulse signal generated by said detector circuit.

3. A circuit for indicating the storage content of a bistable state circuit, comprising: a reference bistable state circuit synchronized to change state each and every time the storage bistable state circuit is able to change storage content; a phase detector capable of generating a pulse signal upon detection of an in-phase relationship between the storage bistable state circuit and said reference bistable state circuit; amplifier means for the pulse signal output from said phase detector; an indicator; and a step-up transformer having its primary winding connected in the output circuit of said amplifier and its secondary winding loaded by said indicator; said indicator comprising an ionizable lamp.

4. Circuit means for indicating the phase relationship between the outputs of a pair of synchronized phase bistable flip-flops, comprising: a logical "and" circuit having inputs connected to the outputs of said flip-flops; a positive potential source; a resistor connected between said positive potential source and the output of said "and' circuit; a current multiplication transistor having a base electrode also connected to the output of said "and" circuit output, an emitter electrode connected to ground, and a collector electrode; a step-up transformer having a primary winding and a secondary winding, the primary winding being connected between said positive potential source and the collector electrode of said transistor; and an indicator loading the secondary winding of said transformer, said indicator comprising an ionizable lamp.

References Cited in the file of this patent

UNITED STATES PATENTS

| | | |
|---|---|---|
| 2,615,127 | Edwards | Oct. 21, 1952 |
| 2,641,696 | Woolard | June 9, 1953 |
| 2,700,148 | McGuigan | Jan 18, 1955 |
| 2,776,420 | Woll | Jan. 1, 1957 |
| 2,814,019 | Bender | Nov. 19, 1957 |
| 2,864,006 | Vandeven | Dec. 9, 1958 |
| 2,878,298 | Giacolleto | Mar. 17, 1959 |
| 2,900,620 | Johnson | Aug. 18, 1959 |